Aug. 5, 1952     DE WITT C. SHATTUCK     2,605,919
HYDRAULIC HAYFORK AND BOOM
Filed Jan. 14, 1949     2 SHEETS—SHEET 1
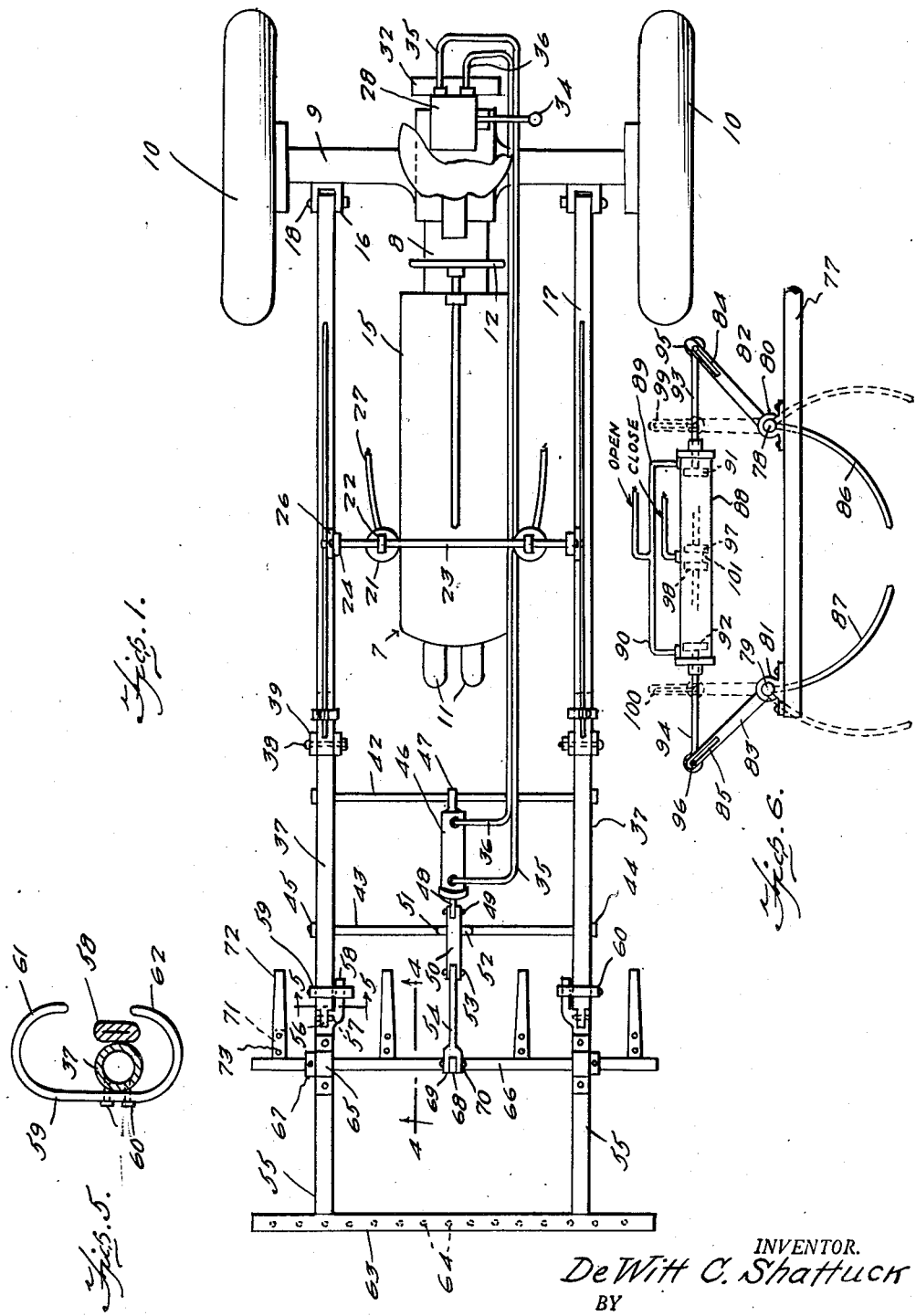
INVENTOR.
De Witt C. Shattuck
BY
McMorrow, Berman + Davidson
ATTORNEYS

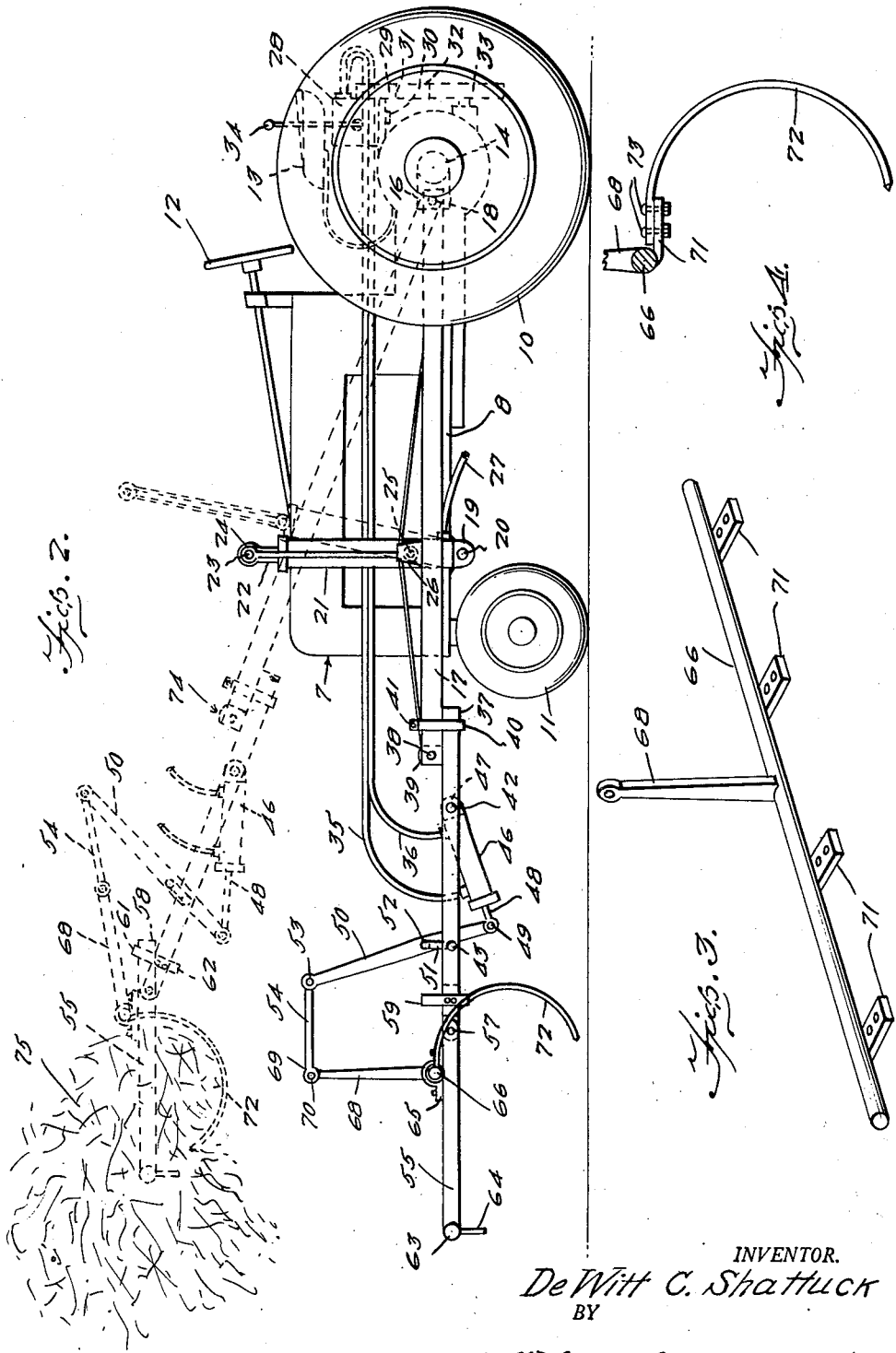

Patented Aug. 5, 1952

2,605,919

UNITED STATES PATENT OFFICE 2,605,919

HYDRAULIC HAYFORK AND BOOM

De Witt C. Shattuck, Velva, N. Dak.

Application January 14, 1949, Serial No. 70,918

3 Claims. (Cl. 214—147)

This invention relates to tractor-mounted and operated devices and the like, and particularly to a mechanically-operated hay fork and extension boom for carrying the same.

It is one important object of the present invention to provide a structure of the character referred to wherein a vertically swingable boom, having means at its outer end for engaging a quantity of hay or the like, will be adjustable under the control of an operator between a lower position in which it extends substantially horizontally, and an upper position in which it is inclined, with said boom to be elevated above a ground surface in not only the upper position thereof, but also the lower position, thus to be properly disposed relative to a pile of hay a portion of which is to be engaged by said means.

Another important object is to provide a hay-engaging means at the outer end of said boom including a rake frame having spaced, opposing groups of tines, which frame will be so mounted upon the boom as to extend substantially horizontally in the various positions to which the boom is swung, thus to locate the rake frame properly for engaging a quantity of hay between said groups of tines, in all positions of the boom.

A further important object is to provide stop means cooperating between the rake frame and boom, that will be particularly adapted to effect the retention of the rake frame in a substantially horizontal position, in both the upper and lower positions of the boom.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which:

Figure 1 is a plan view of a tractor equipped with a hydraulically-operated hay fork and boom extension made according to the invention and embodying the same in a practical form;

Figure 2 is a side elevation of the same tractor and hay fork and boom equipment illustrated in Figure 1;

Figure 3 is a perspective view of a hay fork part to disclose the construction thereof;

Figure 4 is a fragmentary section taken on line 4—4 in Figure 1;

Figure 5 is a section taken on line 5—5 in Figure 1;

Figure 6 is a fragmentary side elevation illustrating a modification.

Throughout the views the same reference numerals indicate the same or like parts.

Referring to the drawings in detail, a tractor, generally indicated at 7, has a frame 8 rearwardly provided with the axle housing 9, having the rear supporting wheels 10, 10 at the ends thereof, while forwardly a pair of wheels 11 are capable of being steered from the steering wheel 12 in conventional manner by an operator sitting on the seat 13 at the rear of the tractor. The rear wheels 10 are fixed on the rear shaft or axle 14 rotatable in axle housing 9 and driven by the engine 15 mounted on the tractor frame 8. Upon both sides of the housing are fixed forwardly-directed lugs 16, 16 to which a pair of booms 17, 17 are pivotally connected by means of bolts 18, 18. At the sides of the frame 8, but rearwardly of the front wheels 11 are fixed a pair of depending lugs 19 in which is mounted a pivot shaft 20 for pivotally supporting a pair of hydraulic upright cylinders 21, 21 provided with upwardly-extending plungers 22 through the upper ends of which extends a transverse suspension shaft 23 from which in turn depends a pair of supporting links 24 connected by pivot pins 25 to a pair of upwardly-extending lugs 26 fixed on booms 17. To the lower portions of hydraulic cylinders 21 are connected a pair of hydraulic fluid lines 27, 27 which are connected with the conventional hydraulic pressure supply means on the tractor (not shown), so that hydraulic pressure fluid is communicated to cylinders 21 for operating plungers 22 in a manner which forms no actual part of the present invention.

In order to utilize the boom equipment just described, on tractor 7, a power take-off driven pump 28 is fixed on a bracket 29 on the rear portion of frame 8 beneath the seat 13 by means of screws 30 and provided with a pulley 31 driven through a belt 32 by the power take-off pulley 33, the pump being controlled by a manually-operated lever 34. To the rear of the pump 28 are connected two hydraulic lines or pipes 35, 36 which extend forward alongside the engine 15 for operating mechanism which will now be detailed specifically.

Upon the forward ends of booms 17, 17 are secured a pair of boom extensions by means of bolts 38, 38 extending through the forward ends of said boom members 17 and a pair of upwardly-projecting lugs 39 on the boom extensions 37 and a short distance rearwardly of the lugs 39 also by a pair of straps 40 enveloping the rear ends of the boom extensions 37 and the forward ends of boom members 17, while being secured together at the upper portions thereof by means of screws or bolts 41. The net result is that the boom extensions 37 are held together to form rigid units at each side of the tractor, and extending forwardly therefrom and capable of being raised or lowered by means of hydraulic plungers 22 previously described. Both boom extensions 37 are secured together by means of a pair of transverse tie rods 42, 43 secured at the ends by heads 44 and nuts 45 to prevent spreading of the booms and their extensions, and also to provide a mounting upon rod 42 for the rear end of an auxiliary hydraulic cylinder 46 having the rear lug 47 pivotally mounted on the mentioned rod, the two previously-mentioned hydraulic pipes or hose lines 35, 36 being connected to the forward and the rear ends of the mentioned hydraulic cylinder 46. From the forward portion of hydraulic cylinder 46 extends a plunger 48 connected by a pivot pin 49 to the rear end of the lever 50 pivoted on a pair of upwardly-extending bent rod posts 51, 51 upon their upper mutual connection 52, a further pivot pin 53 connecting the upper end of lever 50 with a link 54. The arrangement is such that forward movement of plunger 48 will swing lever 50 clockwise and thus draw link 54 rearwardly, while on the other hand, rearward movement of plunger 48 will produce counter-clockwise movement of lever 50 about its pivot pin 52 with consequent forward movement of link 54. Upon the forward ends of boom extensions 37 are supported a pair of forwardly-extending rake bars 55, 55 by means of lugs 56 pivotally connected to the rear ends of bars 55 by means of pivot pins 57, while upon the rear ends are fixed a pair of rearwardly-extending fingers 58, 58. Co-operating with the mentioned rearwardly-extending fingers 58 are a pair of C-brackets 59, 59 secured to the forward ends of extensions 37, 37 by means of bolts or screws 60 in such manner that the upper and lower hooks 61, 62 serve to limit the pivotal movement of finger 58 about pivot pins 57 in order to provide predetermined positions for the rake bars 55 in raised and lowered positions of the boom members. The latter are connected together at the outer ends thereof by means of transverse rake 63 provided with downwardly-extending rake tines 64.

Upon the rear portions of the two rake bars 55 are fixed a pair of bearings 65, 65 for a rake shaft having a pair of collars 67 secured thereto upon the outer sides of bearings 65 in order to prevent axial movement of shaft 66. Upon the intermediate portion of shaft 66 is fixed a vertically-projecting arm 68 brazed or welded thereto, while upon the forward end of previously-mentioned link 54 is a fork 69 pivotally connected to the upper end of arm 68 by means of a pivot pin 70, so that partial rotation of lever 50 by means of plunger 48 extending slidably from hydraulic cylinder 46 will cause corresponding oscillation of rake shaft 66. Upon the latter are fixed a series of rearwardly-extending lugs 71, 71 to which are secured individually a group of rearwardly and downwardly-arched fork tines 72, 72 by means of rivets or screws 73, so that if shaft 66 is partially rotated in clockwise direction, the depending arcuate tines 72 will be swung forwardly toward the downwardly-extending rigid tines 64 of rake 63.

The arrangement is such that if control lever 34 is operated to control a valve (not shown) forming part of the pumping unit 28, it is possible when the tractor engine is running to cause hydraulic pressure fluid to be positively supplied through pipe or hose 35 to the forward end of hydraulic cylinder or jack 46 and thereby withdraw the plunger 48 rearwardly into the cylinder and thereby in turn swing lever 50 counter-clockwise and thus push link 54 forwardly and with it the upper end of arm 68 to partly rotate fork shaft 66 in counter-clockwise direction, with the result that the tines 72 are swung rearwardly toward the tractor, opening the fork and increasing the distance between the tines 72 and the rake tines 64. If the boom structure is then allowed to descend to its lowest position, the rake structure including bars 55 and rake 63 will tend to gravitate with the tines 64 lowered into the hay or like forage which is to be loaded on a truck or hay wagon, while the fork tines 72 remain in rearwardly-withdrawn position. If at this time the manual control lever 34 is shifted to cause the pump 28 to supply pressure fluid to hose or pipe 36, which in turn supplies the pressure fluid to the rear end of cylinder 46, plunger 48 will be urged forward from the position shown in Figures 1 and 2, swinging lever 50 clockwise and thereby drawing upper link 54 rearwardly, which obviously swings the normally upright arm 68 toward the right or clockwise, and thus swings fork tines 72 forwardly toward rake 63 with its downwardly-extending tines 64. When such operation of the fork shaft 66 occurs while the boom structure is in its lowermost position adjacent to a haystack, for example, fork tines 72 will cooperate with the rake tines 64 to grip a quantity of hay between them, and if then the conventional apparatus on the tractor is operated to supply hydraulic fluid to the upright hydraulic jacks 21 through tubes 27 in order to raise plungers 22, a position will be attained which is indicated in broken lines at 74. The rearwardly-extending fingers 58 of the two rake bars 55 are capable of swinging a short distance clockwise about pivot members 57 according to the higher or lower contact that rake 63 would make with the hay in the stack. When the boom structure is raised with a load of hay between the fork and the rake, the rake unit including rake members 55 and rake 62 will tend to gravitate downwardly about pivots 57 until fingers 58 strike the upper hooks 61 of the C-brackets 59, with the result that the rake unit is substantially horizontal, although the boom unit as a whole is inclined upwardly in a forward direction. If at this time the charge of hay held between the fork tines 72, as indicated at 75, is held over a hay wagon or hayrack for the purpose of dropping the hay into the same, manipulation of control lever 34 in the opposite direction to that in which it was previously shifted will cause the pump to project hydraulic pressure fluid through hose or pipe 35 to the forward end of jack or cylinder 46 with the result that plunger 48 will move rearwardly to swing lever 50 counter-clockwise and thereby open the fork by swinging fork shaft 66 counter-clockwise and withdrawing the fork tines 72 rearwardly toward the tractor away from rake 63, dropping the hay into the hay wagon or rack.

While the form of the invention described includes the stationary or rigid rake 63 which is merely fixed upon the forward ends of rake bars 55, an effective modification is also possible in which a pair of opposite forks are used as partially shown in Figure 6. In this figure, instead of the two previously-described rake bars 55 being connected at the forward ends of boom extensions 37, a pair of fork bars 77 are pivotally connected thereto in similar fashion, as already described, for rake bars 55, and instead of having a single fork shaft transversely mounted upon the bars, two fork shafts 78, 79 are mounted in the bearings 80, 81 in spaced-apart relation, the intermediate portions of the shafts being provided with upwardly-projecting operating arms 82, 83 having elongated slots 84, 85 in the upper ends thereof, while depending from shafts 78 and 79 are a pair of groups of fork tines 86, 87. The provision of the slots 84, 85 effects a progressive decreasing of the speed of movement of the tines 86, 87 toward each other during their travel from the dotted to the full line positions thereof seen in Figure 6. Thus, the tines move rapidly during their initial movement toward one another, but as the hay is grasped thereby and compressed somewhat therebetween, the tines move more slowly, to assure a firmer grasp upon the hay. Above the fork frame members 77 is mounted a two-way double-action hydraulic cylinder 88 by support means, not shown, having the hose or pipe 35 connecting with two branch pipes 89, 90 communicating with the ends of cylinder 88, while the other pipe 36 communicates with the center or intermediate portion of cylinder 88. Within cylinder 88 just referred to a pair of plungers 91, 92 are reciprocable in symmetrically opposite directions with plunger shanks 93, 94 projecting slidably out through the ends of the cylinder and upon their extremities provided with studs 95, 96 extending slidably into the slots 84 and 85 in the outer ends of arms 82 and 83.

The arrangement is such that a pressure fluid is supplied to pipe 35 and thereby the branches 89 and 90 so as to communicate the fluid pressure to the interior of the ends of cylinder 88. The plungers or pistons 91 and 92 will be propelled from the ends toward the central position, as indicated at 97, 98, which will cause the plungers 93 and 94 extending outside of the cylinder to draw the arms 82 and 83 from the position shown in full lines to that shown in broken lines at 99, 100, which obviously opens the fork tines 86 and 87 apart, as also shown in broken lines. Intermediate the two pistons is a fixed stop within the interior of cylinder 88 in such position that when the pistons have reached the same they are prevented from approaching each other further and instead are disposed in proper position to be operated on by pressure fluid entering through pipe 36 into the center or intermediate portion of cylinder 88, whereupon the pistons will be forced apart again to the end positions originally referred to when the arms 82 and 83 on shafts 78 and 79 will be forced apart in opposite directions, with the result that fork tines 86 and 87 are brought together again in position to clutch a load of hay between them.

Manifestly, variations may be resorted to and parts and features may be modified or used without others within the scope of the appended claims.

Having now fully described my invention, I claim:

1. In a hydraulic hay fork for attachment to a tractor, a longitudinally extending boom having one end extending forwardly of said tractor and having its other end mounted on said tractor for swinging movement about an axis extending transversely of said tractor, said boom being swingable between a substantially horizontal lower position and an inclined upper position and being elevated when in said lower position above a surface on which the tractor is supported, a rake frame having one end positioned in end to end relation with respect to said one end of said boom and mounted on the latter for free pivotal movement about an axis extending transversely of said boom upon swinging movement of said boom, a first group of spaced rakes arranged transversely of and depending from said rake frame and mounted adjacent said one end of the latter for movement toward and away from said rake frame, a second group of rakes disposed in face to face spaced relation with respect to said first group of rakes and mounted on and depending from the other end of said frame, fingers rigid with the rake frame and extended rearwardly and longitudinally of the boom from said pivotal mounting of the frame upon the boom, C-shaped brackets secured to the boom and embracing said fingers, the upper ends and lower ends of the brackets engaging the fingers on downward and upward swinging movement, respectively, of the rake frame relative to the boom and limiting the rake frame against swinging in either direction beyond positions in which, in both the upper and lower positions of the boom, the rake frame is disposed in a substantially horizontal plane, and hydraulic means disposed longitudinally of said rake frame and operatively connected to said first group of rakes for effecting the movement of the latter toward and away from said rake frame.

2. In a hydraulic hay fork for attachment to a tractor, a longitudinally extending boom having one end extending forwardly of said tractor and having its other end mounted on said tractor for swinging movement about and axis extending transversely of said tractor, said boom being swingable between a substantially horizontal lower position and an inclined upper position and being elevated when in said lower position above a surface on which the tractor is supported, a rake frame having one end positioned in end to end relation with respect to said one end of said boom and mounted on the latter for free pivotal movement about an axis extending transversely of said boom upon swinging movement of the latter, a first group of rakes depending from and arranged transversely of said rake frame and mounted adjacent said one end of the latter for movement toward and away from said rake frame, a second group of rakes disposed in face to face spaced relation with respect to said first group of rakes and dependingly mounted on said rake frame for movement toward and away from the latter, fingers rigid with the rake frame and extended rearwardly and longitudinally of the boom from said pivotal mounting of the frame upon the boom, C-shaped brackets secured to the boom and embracing said fingers, the upper ends and lower ends of the brackets engaging the fingers on downward and upward swinging movement, respectively, of the rake frame relative to the boom and limiting the rake frame against swinging in either direction beyond positions in which, in both the upper and lower positions of the boom, the rake frame is disposed in a substantially horizontal plane, and hydraulic means disposed longitudinally of said rake frame intermediate said first and second groups of rakes and operatively connected thereto for selectively effecting movement of said first and second groups of rakes toward and away from said frame and from each other.

3. In a hydraulic hay fork for attachment to a tractor, a longitudinally extending boom having one end extending forwardly of said tractor and having its other end mounted on said tractor for swinging movement about an axis extending transversely of said tractor, said boom being swingable between a substantially horizontal lower position and an inclined upper position and being elevated when in said lower position above a surface on which the tractor is supported, a rake frame having one end positioned in end to end relation with respect to said one end of said boom and mounted on the latter for free pivotal movement about an axis extending transversely of said boom upon swinging movement of the latter, a first group of rakes depending from and arranged transversely of said rake frame and mounted adjacent said one end of the latter for movement toward and away from said rake frame, a second group of rakes disposed in face to face spaced relation with respect to said first group of rakes and dependingly mounted on said rake frame for movement toward and away from the latter, fingers rigid with the rake frame and extended rearwardly and longitudinally of the boom from said pivotal mounting of the frame upon the boom, C-shaped brackets secured to the boom and embracing said fingers, the upper ends and lower ends of the brackets engaging the fingers on downward and upward swinging movement, respectively, of the rake frame relative to the boom and limiting the rake frame against swinging in either direction beyond positions in which, in both the upper and lower positions of the boom, the rake frame is disposed in a substantially horizontal plane, hydraulic means disposed longitudinally of said rake frame intermediate said first and second groups of rakes and operatively connected thereto for selectively effecting movement of said first and second groups of rakes toward and away from said frame and from each other, and manually actuable means operatively connected to said boom for positioning the latter in select positions of its swinging movement.

DE WITT C. SHATTUCK.

REFERENCES CITED

The following references are of record in the file of this patent:

UNITED STATES PATENTS

| Number | Name | Date |
|---|---|---|
| 1,773,478 | Dovel | Aug. 19, 1930 |
| 2,410,567 | Christiansen | Nov. 5, 1946 |
| 2,412,845 | Stevens | Dec. 17, 1946 |
| 2,418,251 | Drott | Apr. 1, 1947 |
| 2,427,461 | Johnson | Sept. 16, 1947 |
| 2,474,374 | Shattuck | June 28, 1949 |
| 2,482,612 | Drott et al. | Sept. 20, 1949 |
| 2,488,767 | Drott et al. | Nov. 22, 1949 |